Patented Nov. 26, 1929

1,737,203

UNITED STATES PATENT OFFICE

WALTER SCHOELLER, OF BERLIN-WESTEND, AND CLEMENS ZÖLLNER, OF BERLIN-CHARLOTTENBURG, GERMANY, ASSIGNORS TO THE FIRM SCHERING-KAHLBAUM AKTIENGESELLSCHAFT, OF BERLIN, GERMANY

KETONE AND METHOD OF MAKING SAME

No Drawing. Application filed December 16, 1927, Serial No. 240,612, and in Germany December 15, 1923.

Our invention relates to a new composition of matter, being a ketone, and to the method of making this and similar ketones.

Up to this day the addition of organic acid chlorides to ethylene only led to the corresponding unsaturated ketones, inasmuch as the alkyl-β-halogen ethyl ketones which may be assumed to be formed as intermediate products, show a great tendency to split off hydrochloric acid. Thus, for instance, Krapiwin (Chemisches Zentralblatt 1910, I. 1336) obtained from acetyl chloride and ethylene only the unsaturated ketone, viz butenone. Only some of the higher olefines show intermediate products having greater stability.

We have now ascertained the surprising fact that such intermediate products can be obtained with a good yield also when effecting the addition of ethylene to organic acid chlorides, if acyl halogenides are treated with ethylene in the presence of condensation agents or catalysts, such as anhydrous aluminium halogenide or iron halogenide, water to be added to the mass at the end of the reaction, preferably under cooling, and the halogen ketone formed being separated or being extracted by lixiviation with an organic solvent.

The reaction occurs according to the formula

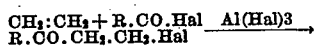

The reaction can also be carried out in the presence of solvents or diluents, for instance a surplus of acyl halogenide or other means such as chloroform, hexane, nitrobenzene being used.

Example 1—Methyl-β-chloro ethyl ketone

Into 100 to 200 parts acetyl chloride dry ethylene is introduced during some hours under cooling and stirring together with the gradual addition of 133 parts aluminium chloride. The product of reaction is poured into ice-water and is shaken several times with ether. The ether, being dried with calcium chloride, on being distilled off leaves a fair yield of methyl-β-chloro ethyl ketone, which can be purified by distillation in vacuo. The compound is a limpid and colorless oil, boiling at 50–55° C. under 16 mms. mercury pressure and having a very pregnant smell. When allowed to stand for a longer time, it gradually assumes a dark color.

Example 2—Methyl-β-bromo ethyl ketone

The production of this compound is effected in analogy to Example 1, ethylene being made to react with acetyl bromide in the presence of aluminium bromide. The smell of this compound closely resembles that of the corresponding chlorine compound. The boiling point of the product is 55-60° C. under 15 mms. mercury pressure.

Example 3

To 60 parts acetyl chloride are added under vigorous stirring and cooling 81 parts of anhydrous sublimated iron chloride in portions. At the same time dry ethylene is introduced and further 60 parts acetyl chloride are gradually added in drops. The product of reaction is poured into cold water and is shaken with ether. On the dried ether being distilled off, there remains over the methyl-β-chloro ethyl ketone described in Example 1.

Example 4

Into 120 parts hexane or carbon disulfide is introduced under cooling with water and stirring dry ethylene, at the same time 120 parts acetyl chloride and 133 parts aluminium chloride being gradually added. After the lapse of a few hours the mixture is poured onto ice and the layer of hexane or carbon disulfide is separated. The watery layer is preferably once more shaken with ether. The organic solvents are dried and subjected to distillation and leave over the methyl-β-chloro ethyl ketone.

Example 5

To 100 parts propionyl chloride are added in small portions and under stirring 50 grams of finely powdered aluminium chloride, the mixture being cooled with ice and ethylene being simultaneously introduced. The mixture is treated further as described with reference to Example 1. One obtains ethyl- β-chloro ethyl ketone boiling at 48-56° C. under 13 mms. mercury pressure.

Various changes may be made in the details disclosed in the foregoing specification without departing from the invention or sacrificing the advantages thereof.

We claim:—

1. As a new product, methyl-β-bromo ethyl ketone, being a limped colorless oil having a very pregnant smell and boiling at 55-60° C. under 15 mms. mercury pressure, the compound having the formula

$$CH_3-CO-CH_2-CH_2-\beta r$$

2. Method of producing alkyl-β-halogen ethyl ketones, comprising causing ethylene to act on acyl halogenide in the presence of a condensing agent and treating the reaction product with water.

3. Method of producing alkyl-β-halogen ethyl ketones, comprising causing ethylene to act on acyl halogenide in the presence of a condensing agent and treating the reaction product with water under cooling.

4. Method of producing alkyl-β-halogen ethyl ketones, comprising causing ethylene to act on acyl halogenide in the presence of a condensing agent and a solvent and treating the reaction product with water.

5. Method of producing alkyl-β halogen ethyl ketones, comprising causing ethylene to act on acyl halogenide in the presence of a condensing agent and a diluent and treating the reaction product with water.

6. Method of producing alkyl-β-halogen ethyl ketones, comprising causing ethylene to act on acyl halogenide in the presence of an anhydrous metal halogenide, and treating the reaction product with water.

7. Method of producing alkyl-β-halogen ethyl ketones, comprising causing ethylene to act on acyl halogenide in the presence of an anhydrous aluminium halogenide and treating the reaction product with water.

In testimony whereof we affix our signatures.

WALTER SCHOELLER.
CLEMENS ZÖLLNER.